D. W. & H. A. LAFETRA.
Raking Attachment for Harvesters.
No. 17,045.
Patented April 14, 1857.
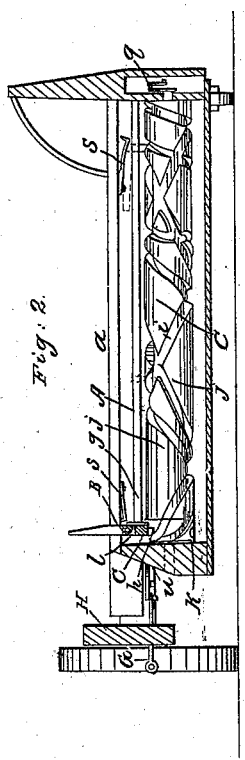
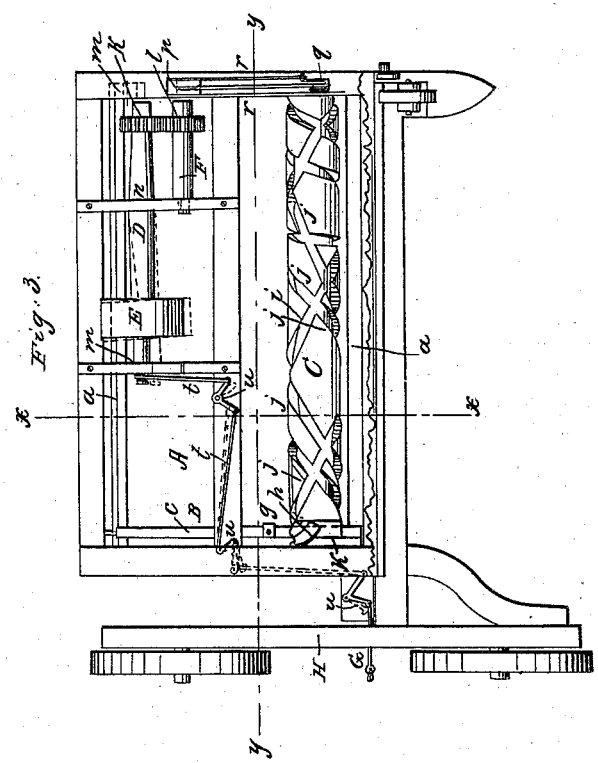
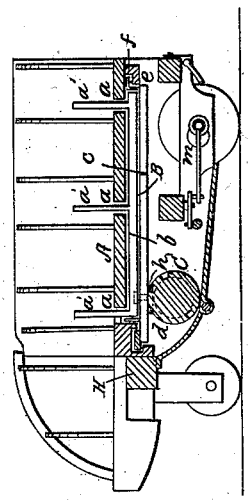

UNITED STATES PATENT OFFICE.

D. W. LAFETRA AND H. A. LAFETRA, OF EATONTOWN, NEW JERSEY.

IMPROVED RAKING ATTACHMENT FOR HARVESTERS.

Specification forming part of Letters Patent No. 17,045, dated April 14, 1857.

*To all whom it may concern:*

Be it known that we, DANIEL W. LAFETRA and HENRY A. LAFETRA, both of Eatontown, in the county of Monmouth and State of New Jersey, have invented a new and Improved Raking Attachment for Harvesters; and we do hereby declare that the following is a full, clear, and exact description of the same, reference being had to the annexed drawings, making a part of this specification, in which—

Figure 1 is a transverse vertical section of a harvester with our improvement applied to it. Fig. 2 is a longitudinal vertical section of the same. Fig. 3 is an inverted plan of the same.

Similar letters of reference indicate corresponding parts in the several figures.

Our invention consists in operating a reciprocating rake by means of a rotating spirally-grooved cylinder, the rake and cylinder being arranged as will be presently shown, motion being also given to the cylinder in a peculiar manner, as will be hereinafter fully shown and described.

To enable those skilled in the art to fully understand and construct our invention, we will proceed to describe it.

A represents the platform of a harvester, the platform having slots $a$ made longitudinally through it and extending its whole length.

B represents the rake, which is formed of teeth $a'$, attached at right angles to a head, $b$, which is secured to a bar, $c$, one end of which is fitted in a groove, $d$, underneath the platform A, at its front end, the opposite end having a plate attached, through which a journal, $e$, at the end of the head $b$, passes, said journal fitting in a groove, $f$, at the back end of the platform and underneath it. The grooves $d\ f$ extend the whole length of the platform, and the head $b$ is allowed to turn on the bar $c$, but is held in place or prevented from casually turning by means of a spring, $g$, which is attached to the bar $c$, and bears against one of the sides of the head $b$, the head being square. The teeth $a'$ of the rake are placed in line with the slots $a$ of the platform, so that when said teeth are elevated they will project up through the slots $a$, as shown in Figs. 1 and 2.

C represents a cylinder, which is placed underneath the platform A, longitudinally with it. This cylinder is grooved spirally in both directions—that is, both right and left grooves are employed—and a projection, $h$, which is pivoted to the under side of the bar $c$, is fitted in the spiral grooves. This cylinder C, as it rotates, gives a reciprocating motion to the rake B, the groove $i$ moving the rake from the outer to the discharge end of the platform, and the grooves $j\ j'$ moving it in the opposite direction. The grooves $j\ j'$ are employed in order to cause the rake to be moved forward at greater or less intervals, in order that the size of the gavels or sheaves may be varied as desired. The grooves $j\ j'$ therefore have different pitches, the groove $j$ being quicker than that of the groove $j'$, as shown plainly in Figs. 2 and 3. On one end of the axis of the cylinder C a collar, $k$, is placed, said collar being placed loosely on the axis, and secured at any point thereon by a set-screw. The ends of the grooves $i\ j\ j'$ are continued into this collar, so that by turning or adjusting said collar on the axis of the cylinder either of the grooves $j$ or $j'$ may be made to throw the rake back to the outer end of the platform.

D represents a shaft, which has a roller, E, on its inner end. The opposite or outer end of the shaft D has a pinion, $k'$, on it, which pinion gears into a corresponding pinion, $l$, on a shaft, F, the said shaft F being parallel with the shaft D. The journals at the ends of the shaft D are placed in oblong bearings $m$, and the center bearing, $n$, is also rather oblong, so that the shaft is allowed to vibrate or have a certain degree of play on its center bearing, $n$. The outer end of the shaft F has a double crank, $p$, attached to it, and a corresponding crank, $q$, is attached to the corresponding end of the cylinder C, the cranks being connected by rods $r$, as shown clearly in Fig. 3.

To the under side of the platform A, and at each end, a spring-catch, $s$, is attached.

The inner end of the shaft D is connected by rods $t$ and bell-cranks $u$ to a lever, G, which passes through one side of the frame H, and is within reach of the driver.

As the machine is drawn along the two pinions $k'\ l$ will be kept in gear in consequence of the roller E bearing upon the ground, and the cylinder C will be rotated by the cranks $p\ q$ and connecting-rods $r$, and the rake B will have a reciprocating motion given it by the spiral grooves $i\,j\,j'$, the teeth $a'$ of the rake being elevated as they reach the outer end of the platform by the spring-catch $s$, which acts upon the head $b$ at that point and turns it, so that the cut grain will be raked off the platform, the rake-teeth being turned down in a horizontal position and below the upper surface of the platform as it moves back to the outer end of the platform.

It will be seen that when the machine is "backed" the rake will not be actuated, as the pinion $k'$ will be thrown out of gear with the pinion $l$.

The groove $i$, that moves the rake from the outer to the inner end of the platform, is much quicker than the other grooves, $j\,j'$, because it is necessary that the cut grain should be raked off quickly, so as not to interrupt the grain as it is cut from passing onto the platform.

The above invention may be cheaply constructed, and will work in a very efficient manner.

We are aware that reciprocating rakes provided with teeth fitted in a slotted platform have been previously used, and various devices have been employed for operating them. We therefore do not claim a reciprocating rake irrespective of the means herein employed for operating it; but

What we claim as our invention, and desire to secure by Letters Patent, is—

1. Operating or giving a reciprocating motion to the rake B by means of the spirally-grooved cylinder C, in combination with the spirally-grooved collar $k$, constructed and arranged substantially as shown and described.

2. Rotating the cylinder C by means of the self-adjusting wheel or roller E and vibrating shaft F, when the same are constructed and arranged in the manner and for the purpose substantially as herein described.

DANIEL W. LAFETRA.
    HENRY A. LAFETRA.

Witnesses:
 SAMUEL ALLGOR,
 TYLER W. WARDELL.